(12) United States Patent
Meeske

(10) Patent No.: US 6,415,022 B1
(45) Date of Patent: Jul. 2, 2002

(54) USER PROGRAMMABLE TELEPHONE WIRING ACCESS TERMINAL

(75) Inventor: Jonathan R. Meeske, Monterey, CA (US)

(73) Assignee: Global Switches Corporation, Monterey, CA (US)

(*) Notice: Subject to any disclaimer, the term of this patent is extended or adjusted under 35 U.S.C. 154(b) by 71 days.

(21) Appl. No.: 09/733,296

(22) Filed: Dec. 7, 2000

(51) Int. Cl.[7] ............................................. H04M 11/00
(52) U.S. Cl. .................... 379/93.05; 379/93.11; 379/327; 379/399.01
(58) Field of Search ..................... 379/93.05–93.07, 379/93.09–93.11, 90.01, 110.01, 291, 292, 306, 325–329, 335, 399.01, 442

(56) References Cited

U.S. PATENT DOCUMENTS 4,326,107 A * 4/1982 Perna ......................... 379/325

OTHER PUBLICATIONS

T. Robinson, "No More Tangles–Smart electronic cross-–connects help get those wiring–closet management problems out of your hair", InternetWeek, Copyright 1995 CMP Publications, Dec. 11, 1995.

Turnstone Systems, Inc., "Copper CrossConnect CX100", Overview.

* cited by examiner

Primary Examiner—Wing F. Chan
(74) Attorney, Agent, or Firm—Thomas Schneck; Mark Protsik

(57) ABSTRACT

A telephone wiring terminal for use in an office building environment connects dedicated telephone lines and PBX or KEY telephone extensions to selected office jacks within an office building. The terminal comprises a customer programmable, electronic cross-connect device in the form of a wall mountable chassis-box with an internal non-volatile switch bank, an internal computer system controlling the switch bank, external telephone line connectors leading to and from the switch bank and external programming access to the computer system. The dedicated lines and extensions connect to one set of connectors while telephone lines leading to the jacks connect to a second set of connectors. Programming access may include a keypad and display on the front of the chassis-box, as well as com and modem ports on the chassis.

18 Claims, 5 Drawing Sheets

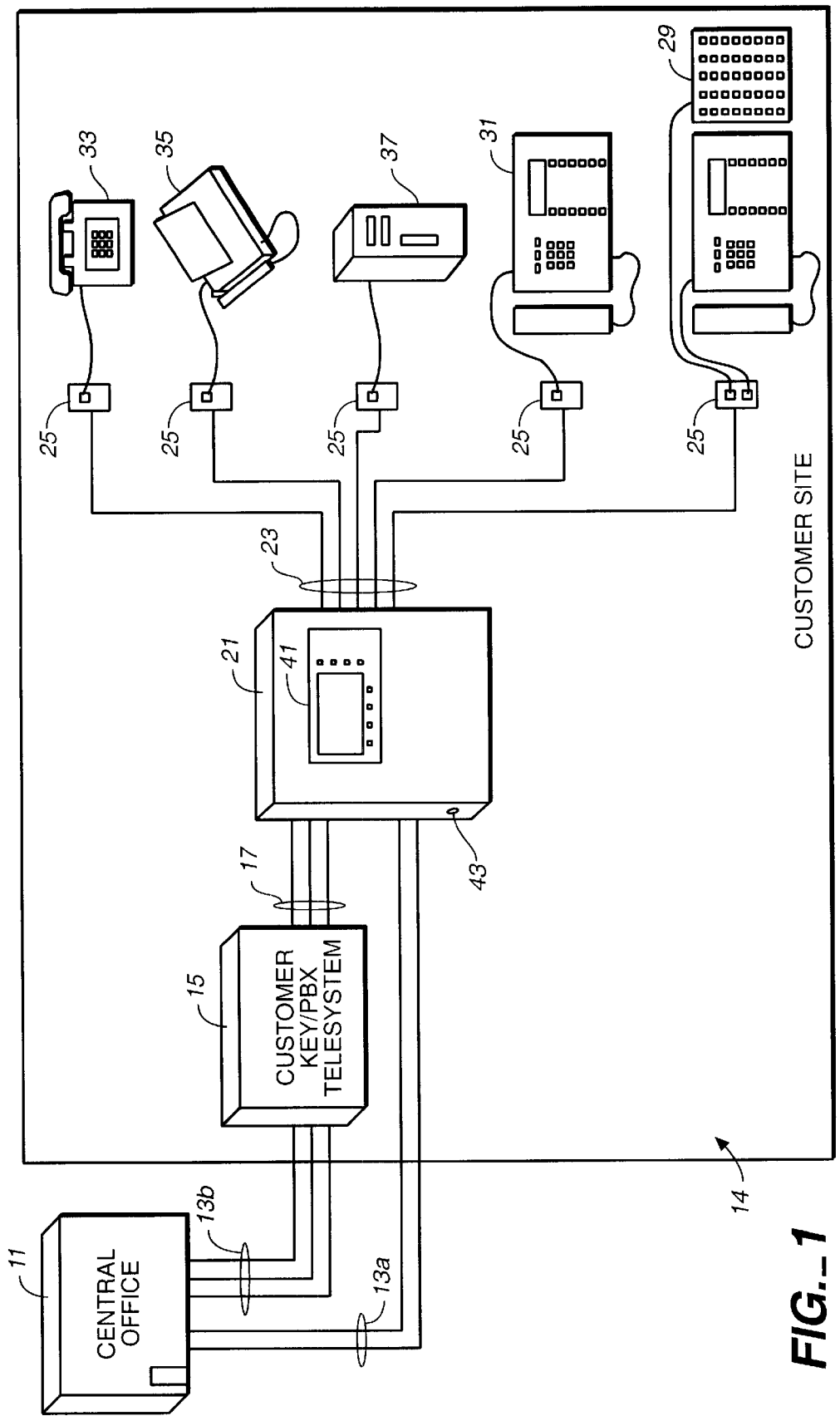
FIG._1

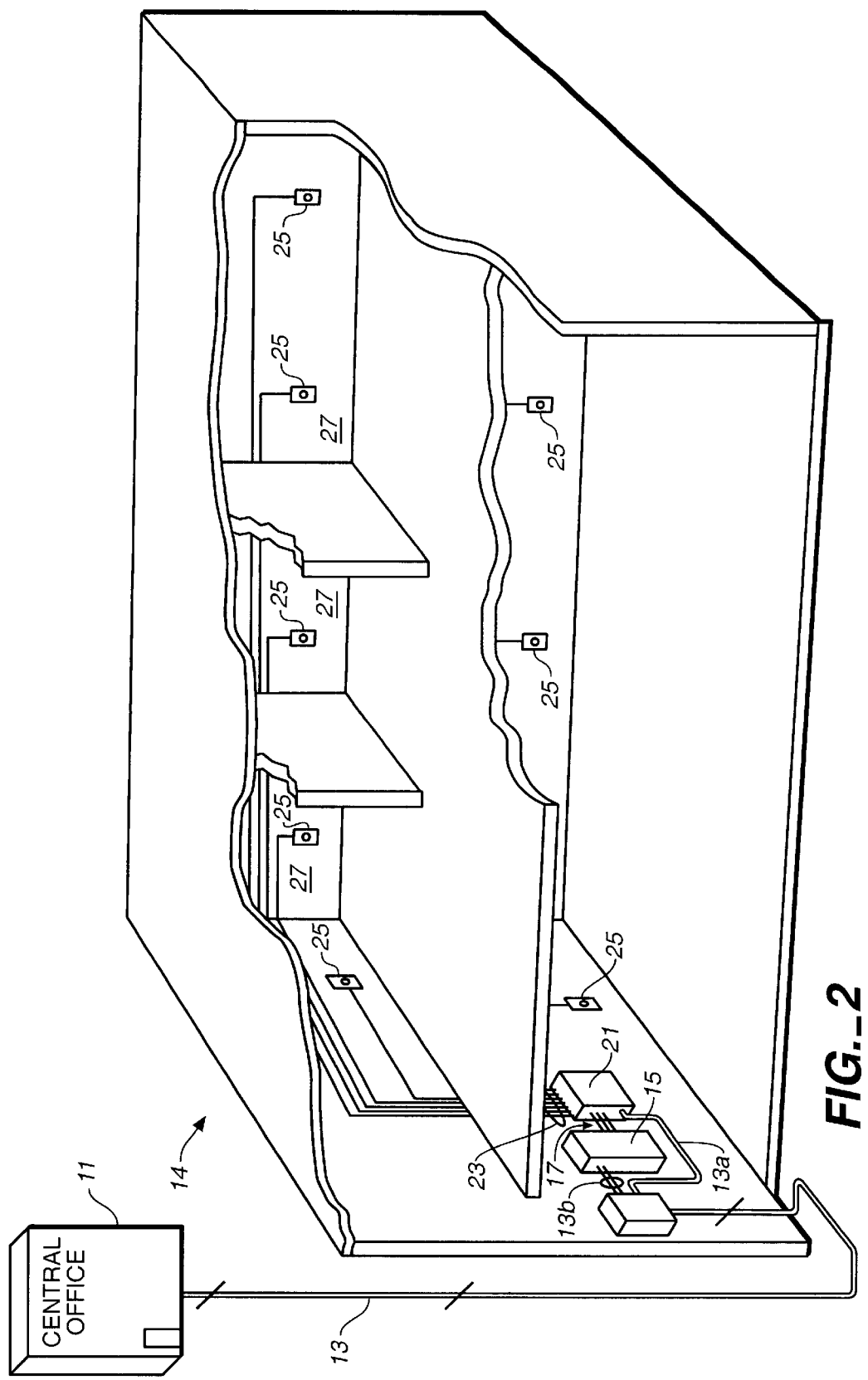
FIG._2

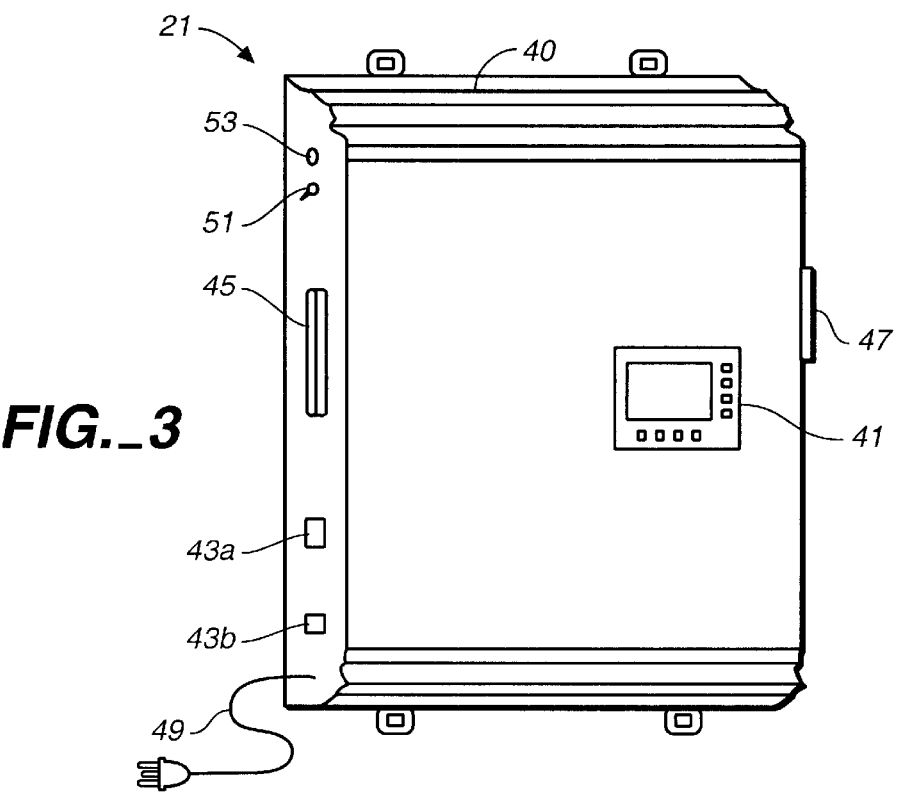
FIG._3
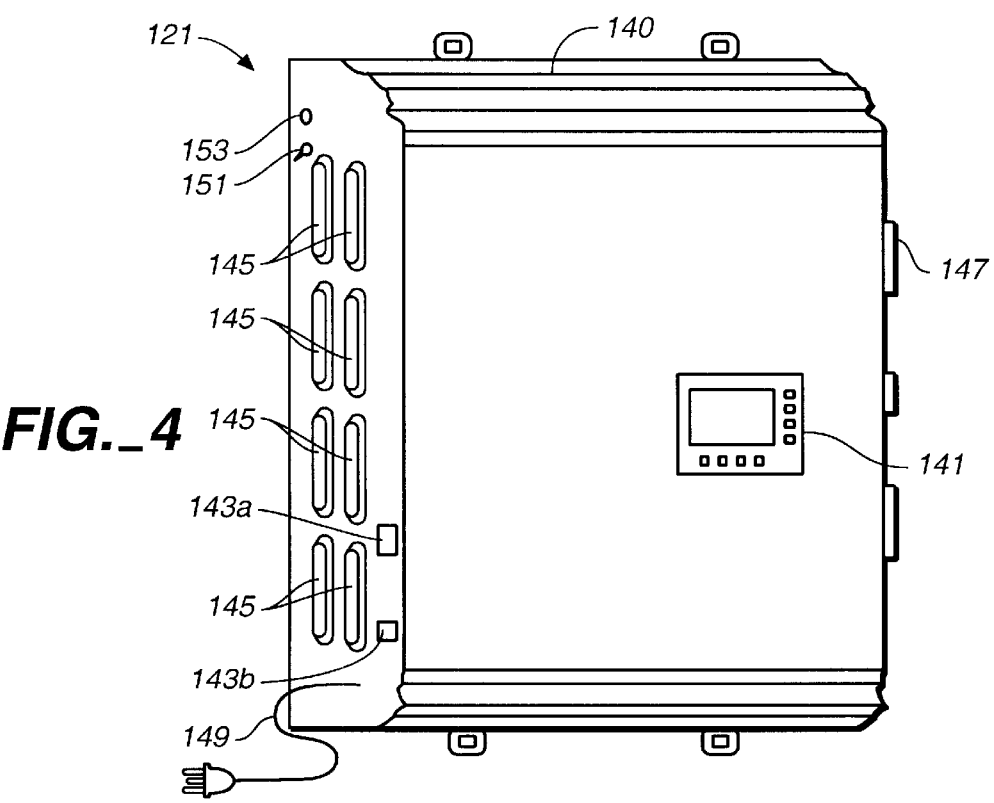
FIG._4

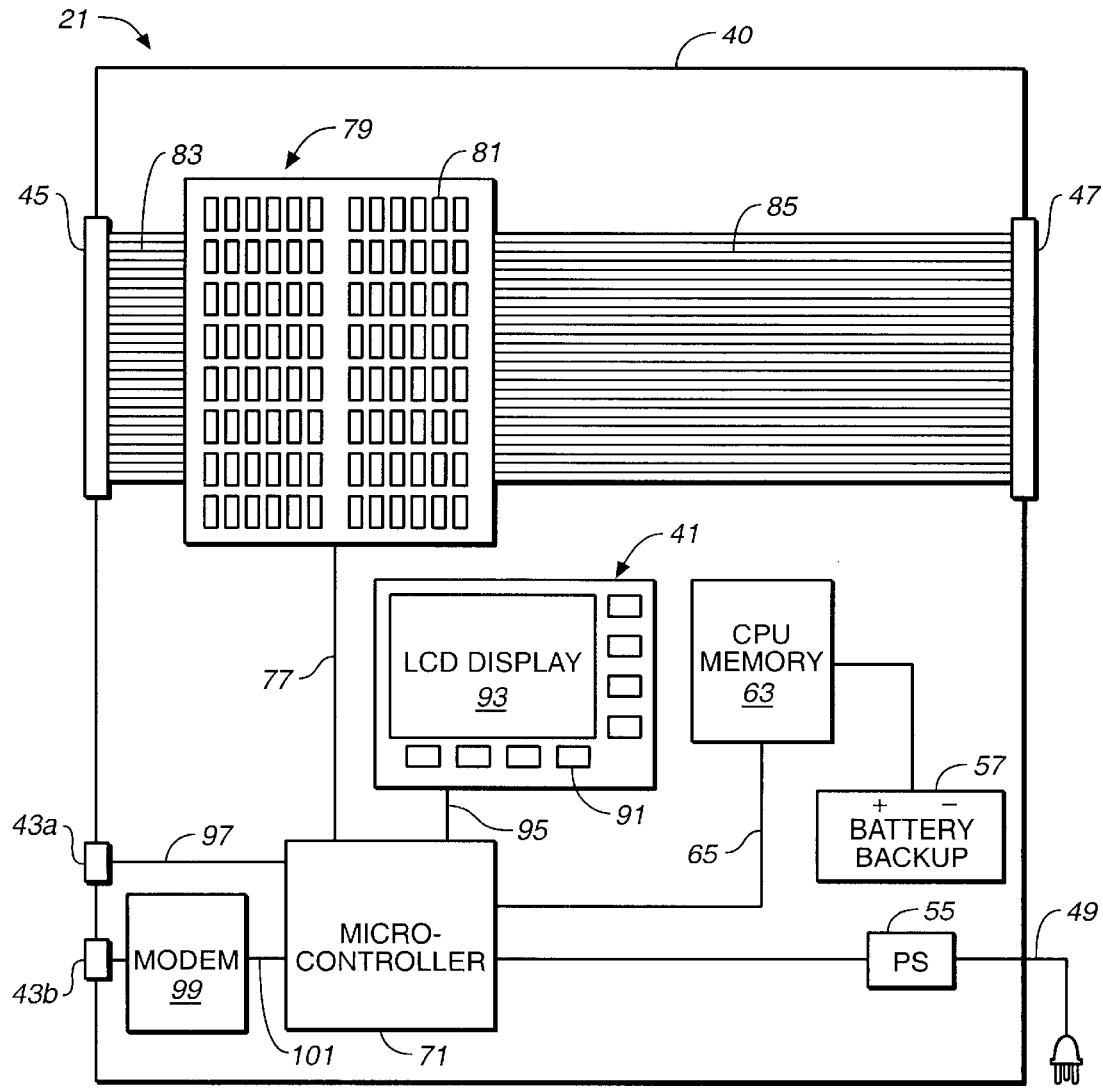
FIG._5

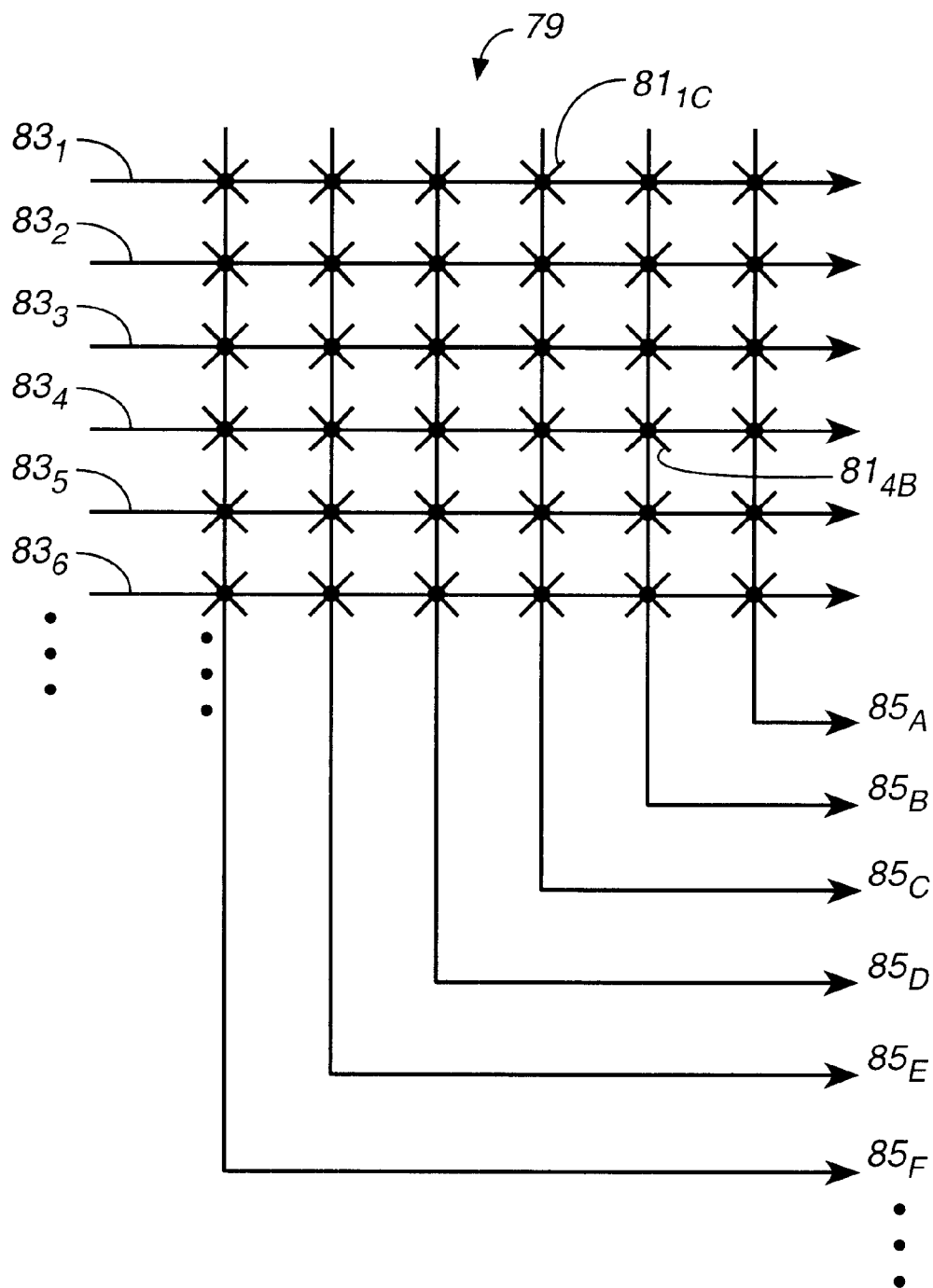
FIG._6

USER PROGRAMMABLE TELEPHONE WIRING ACCESS TERMINAL

TECHNICAL FIELD

The present invention relates to telephonic communications, and in particular relates to apparatus for making telephone wiring connections within a building.

BACKGROUND ART

Within an office building, numerous telephones, facsimile (FAX) machines, and computer modems are connected by telephone wiring through jacks in the several offices and rooms of the building. (The same is also true of many apartment buildings, as well as some residences.) Telephone lines from the local telephone company central office are provided to the customer premise. Each customer may have a private branch exchange (PBX), KEY system, or industry standard telephone instruments in which the various telephone instruments of that customer can be connected to one of their assigned telephone company lines. A main physical link for the phone lines in the building is the wiring terminal wherein the dedicated lines, and PBX and KEY extensions are physically connected through interoffice telephone wiring to the jack outlets at which the telephone units are located. Normally these semi-permanent wiring connections are effected by means of a jumper, cross-connect wire, or patch panel of wire cross-connections. Anytime the connections need to be changed, for example when a new building tenant moves in or when a customer adds new lines or extensions, the physical wires in the telephone terminal must be changed manually. Because the terminal connections can be confusing and not well documented changes usually require the services of a professional.

In the world of digital data networks, changes in network configurations occur somewhat more frequently than in voice telephone communications. To improve the ability to rapidly make service changes in such data networks electronic cross-connects have been developed. For example, the Copper CrossConnect™ CX100 from Turnstone Systems, Inc. of Mountain View, Calif. transparently connects loop-side pairs to corresponding equipment-side pairs electronically for DSL service. The CX100 is deployed in the telephone company central office and a subscriber's DSL service can be changed in a matter of seconds by the service provider so that there is minimal service interruption. Likewise, Nortel Inc.'s Dynatrix, Bytex Corp.'s 7700 switch and NHC Communication Inc.'s Switchex, among others, provide electronic cross-connect switching for local area networks at a customer site. These switches support multiple network protocols and configurations in a data environment, and have allowed automatic switching of computers as network connections have grown more complex.

Because digital network protocols and configurations are more complex and dynamic, the cross-connect switching systems tend to be expensive and solely applicable to their data service providing environment. In comparison, telephone communication systems are normally much more static in their configuration so that the relatively inexpensive patch panel continues to be used.

An object of the present invention is to provide an automated telephone wiring connection terminal for telephone connections in a multi-jack office (or residential) building environment which can be easily and reliably configured by the end user.

DISCLOSURE OF THE INVENTION

The object is met by a customer programmable electronic cross-connect terminal in which telephone wiring connections between (a) PBX and KEY telephone extensions and central office dedicated phone lines on one side to (b) jack outlets connectable to PBX, KEY and standard telephone units, fax machines and computer modems on the other side are made electronically by programming the connections from a key panel on the front of the terminal, from a remote key panel or through remote modem or digital network communication ports. The terminal includes telephone connection ports for the input and output telephone wiring, in which connections are made by an electronic circuit switch bank controlled by a microcontroller internal to the unit. The keypad, with an LCD display, and the modem/com port serve as input/output for programming the system. A microcontroller of the system controls the settings of the switch bank, while the system's memory stores those settings along with software for operating the microcontroller. The simplicity of the terminal results in an inexpensive, yet easier to use, alternative to the manual patch panel presently used in office buildings, reducing the need for technician site visits to make changes to the telephone connections.

BRIEF DESCRIPTION OF THE DRAWINGS

FIGS. 1 and 2 are respective schematic plan and cutaway perspective views of a building telephone wiring system using the customer programmable wiring access terminal of the present invention to make wiring connections between (a) central office telephone lines and customer PBX and KEY telephone system extensions on one side and (b) building outlet jacks for telephones, modems and fax machines on the other side.

FIGS. 3 and 4 are perspective views of two embodiments, differing in the number of wiring connections capable of being made, of the customer programmable wiring access terminal of the present invention, illustrating the exterior programming access panel and exterior connection ports.

FIG. 5 is a schematic block diagram showing the basic components of the customer programmable wiring access terminal of the present invention.

FIG. 6 is a schematic diagram of a full cross-bar switch topology for using in the switch bank in the wiring access terminal of FIG. 5.

BEST MODE OF CARRYING OUT THE INVENTION

With reference to FIGS. 1 and 2, a telephone company central office 11, serving as a local exchange or switching center, connects customers via telephone lines 13 to a telephone network. Each telephone line 13 provided by the telephone company to a customer is identified by a unique telephone number, although a central office 11 may provide an additional switching service to a customer in which a single published phone number may access any unused line among a specified group of such telephone lines 13. Some of the phone lines 13 may be dedicated lines 13a for connection to facsimile (FAX) machines 35 or computer modems 37, while other phone lines 13b may be connected to any of several internal voice lines or extensions 17 though a customer's private branch exchange (PBX) or KEY telephone system. The dedicated lines 13a and extensions 17 on a customer's premises 14 must lead to jacks 25 in the various rooms or offices 27 in order to connect to the PBX, KEY and standard telephone units 29, 31 and 33, fax machines 35 and modems 37 that are plugged into those jacks 25. As already noted above, the prior art employs a patch panel in which wire cross-connects are made manually. The present invention replaces that patch panel with a customer programmable telephone wiring access terminal 21 in which the cross connections in this building environment are made electronically, either directly via a keypad/display access panel 41 on the front of the terminal 21 or remotely via a com/modem port 43. The invention relates to this inter-office cross-connect terminal 21, not to office PBX or KEY telephone systems, nor to central office switching by a telephone company.

As seen in FIGS. 3 and 4, a customer programmable telephone wiring access terminal 21 or 121 of the present invention preferably comprises a wall mountable chassis box 40 or 140, e.g. of lightweight extruded aluminum, containing internal electronics described below with reference to FIG. 5, and having a programming access panel 41 or 141, one or more remote programming access ports of various types, such as a DB-9 com port connector 43a or 143a and a RJ-11 modem port connector 43b or 143b, a set of one or more input wiring connectors 47 or 147, such as 25-pair (50-pin) Amphenol connectors or other standard telephone communication ("Telco")-type connectors, all located on the exterior of the chassis box 40 or 140. Also, the unit 21 or 121 is connectable to a power supply, e.g. via a standard 3-prong wall plug 49 or 149, and has internal memory battery back-up in the event of external power supply failure. The unit 21 or 121 typically also has a power on/off switch 51 or 151 and an indicator light, such as an LED, that indicates when power is on.

The two units 21 and 121 illustrated in FIGS. 3 and 4 differ only in their switching capacity. Unit 21 is provided with a single 25-pair Amphenol Telco-type connector 45 on the "input" side and a single 25-pair female Amphenol connector 47 on the "output" side of the unit and has internal switching electronics for cross-connecting 25 input lines (each formed of a wire pair) to 25 output lines in any combination. The unit 121 in FIG. 4 has 8 input connectors 145 and 8 output connectors 147, with internal switch electronics capable of cross-connecting up to 200 (25×8) input lines to 200 output lines. (Note that the terms "input" and "output" are used solely to designate opposite sides of the unit 21 or 121, not to indicate signal propagation direction. The "input" side designates the side of the unit leading ultimately to the telephone company lines to the central office. The "output" side designates the side of the unit leading to the jacks in the various rooms or offices of the building. Signal propagation in the lines is bi-directional, and a telephone call on any of the lines may originate from either side of the unit.)

With reference to FIG. 5, the input connector 45 is connected to an electronic switch bank 81 via a set of input lines 83. Likewise, the switch bank 81 is connected via a set of output lines 85 to the output connector 47. The input and output lines 83 and 85 are typically wire traces on a printed circuit board, and the number of lines 83 and 85 correspond to the size of the connectors 45 and 47 and the number connectors on the unit. Thus, each 25-pair (50-pin) connector connects to 25 lines, one line for each connector pair. The unit 121 in FIG. 4 with 8 25-pair input connectors 145 and 8 25-pair output connectors 147 would have 200 input lines and 200 output lines connected to that unit's switch bank. The switch bank 81 in FIG. 5 connects selected input lines 83 to selected output lines 85 on a semi-permanent basis. That is, the settings remain fixed over many telephone calls, typically over many months or even years between changes. The switch bank may be constructed with non-volatile memory elements for selecting the setting or configuration of the switches. To avoid signal conflicts the input and output lines 83 and 85 are normally connected on a one-to-one basis, i.e. one input lines to one output line and vice versa. (Conference calls, in which one telephone line is temporarily connected to two or more extensions, are handled by the PBX or Key telephone system and not by the terminal of the present invention, which is reserved for the more permanent extension-to-jack physical wiring connections.) The size of the switch bank 81 is determined by the number of input and output lines 83 and 85 that need to be connected. However, not all of the lines need be connected at any given time. Some may be left unassigned as a reserve for feature extensions.

For example, FIG. 6 shows a typical switch topology that could be used in the present invention. In particular, the diagram represents a full cross-bar switch topology, with 6 input lines $83_1, 83_2, \ldots, 85_6$ shown and 6 output lines $85_A$, $85_B, \ldots, 85_F$ also shown. For each input line/output line pair there is switch element. Thus, input line $83_1$ and output line $85_C$ have a corresponding switch $81_{1C}$, whereas input line $83_4$ and output line $85_B$ have a different switch element $81_{4B}$. The total number of switch elements is the product of the number of input lines times the number of output lines (or since the number of input and output lines are equal, the number of input lines squared). Each switch element can be in the off state or in the on state. For a one-to-one connection, only one of the switches in the row associated with any given input line would be on, and likewise only one of the switches in the column associated with any given output line would be on. The switches can be single-pole, double-throw (SPDT) elements.

The switch bank connection settings are controlled by a computer system that includes a microcontroller 71 (an integrated microprocessor and controller), memory 63 and programming I/O components 91, 93, 97 and 99. The controller 71 connects to the switch bank 81 via a control line or bus 77 for selecting the switch bank settings. The microcontroller 71 makes these selections based on instructions received from any one or more of the programming I/O components 91, 93, 97 and 99. In particular, the direct programming access panel 41 on the front of the unit 21 preferably comprises a keypad 91 for inputting switch selections and an LCD display 93 for graphically presenting menu options and the like. (Alternatively, or in addition to the keypad 91, the display itself could serve as a touch pad or other input device used in combination with a pen-type pointer in which displayed input and output lines could be connected simply by pointing and clicking at selected positions on the display.) The keypad/display access panel 41 connects via a set of signal lines 95 to the microcontroller 71. The com port 43a may be an RS-232 serial data port connected to the controller 71 via a signal line 97. The port 43b connects to a modem 99, which in turn connects to the controller 71 via a signal line 101. The com and modem ports 43a and 43b permit the switch settings to be programmed remotely. For example, the com port 43a might be connected to a local area network (LAN), through which the unit 21 could be programmed at a computer terminal connected to that network. The modem port 43b could be connected to a dedicated telephone line 13a or to an office extension 17 for dial-up programming capability.

A CPU memory 63 connected to the microcontroller 71 via a bus 65 stores the programmed switch selections, as well as software for microprocessor operation. The external power supply plug 49 connects to a power supply unit 55 (with AC to DC conversion capability) for supplying electric power to all of the various system components. A battery back-up 57 maintains memory in the event of an external power failure so that system settings are not lost.

Alternatively, the CPU memory 63 could be a non-volatile memory, such as an EEPROM.

What is claimed is:

1. A customer programmable, building telephone wiring terminal, comprising:

a chassis-box having first and second sets of telephone wiring connectors or an exterior thereof, said first connector set connectable to telephone lines and extensions leading ultimately to a phone company central office and said second connector set connectable to in-building telephone wiring leading immediately to jacks to which telephone, facsimile machine and computer modems may be connected;

an electronic switch bank within said chassis-box, with first telephone signal lines connecting said first connector set to said switch bank and second telephone signal lines connecting said switch bank to said second connector set, the switch bank capable of selectively and semi-permanently cross-connecting at least a subset of first telephone signal lines to at least a subset of second telephone signal lines on a one-to-one basis; and a microcontroller system within said chassis-box and with programming access on the exterior of said chassis box, the microcontroller system connected to said electronic switch bank for controlling settings for said switch bank, whereby a customer may program the wiring terminal via said exterior programming access to connect any telephone line or extension to any jack.

2. The telephone wiring terminal of claim 1 wherein there is only a single 25-pair connector in said first connector set and only a single 25-pair connector in said second connector set, with 25-pairs of first telephone signal lines and 25-pairs of second telephone signal lines connected to said switch, the switch bank having a capacity to cross-connect up to 25-pairs of first telephone signal lines to a corresponding number of second telephone signal lines on a one-to-one basis.

3. The telephone wiring terminal of claim 1 wherein each of said first and second sets of telephone wiring connectors comprise a plurality of standard connectors, the number of first and second telephone signal lines corresponding to the line capacity of said plurality of standard connectors, and the switch bank having a capacity to cross-connect all first and second telephone signal lines on a one-to-one basis.

4. The telephone wiring terminals of claim 1 wherein said programming access includes a keypad on the exterior of said chassis-box.

5. The telephone wiring terminal of claim 4 wherein said programming access further includes a display associated with said keypad.

6. The telephone wiring terminal of claim 1 wherein said programming access includes a display panel and pointer input device.

7. The telephone wiring terminal of claim 1 wherein said programming access includes a digital data communications port connectable to a computer network.

8. The telephone wiring terminal of claim 1 wherein said programmable access includes a modem port connectable via telephone to a remote programming terminal.

9. The telephone wiring terminal of claim 1 wherein said microcontroller system includes a microcontroller, and a memory storing programmed switch bank settings and software for operating said microcontroller, said microcontroller interfacing with said programming access and with said switch bank.

10. The telephone wiring terminal of claim 9 wherein said memory is a non-volatile memory.

11. A method allowing an end user to program telephone wiring connections for a building via an access terminal, comprising:

providing a user programmable telephone wiring access terminal to a building, the access terminal having a first set of connectors connectable to telephone lines and extensions leading ultimately to a phone company central office, the access terminal also having a second set of connectors connectable to in-building telephone wiring leading immediately to jacks in rooms or offices of the building to which telephone facsimile machine and computer modems may be connected, and the access terminal further having a user programmable microcontrolled switch bank contained therein capable of selectively and semi-permanently cross-connecting telephone signal lines from the first set of connectors to telephone signal lines from the second set of connectors on a one-to-one basis;

connecting the telephone lines and any extensions to the first set of connectors and also connecting the in-building telephone wiring to the second set of connectors, and programming the switch bank of the access terminal via exterior programming access for the terminal, such that each telephone line or extension connects to in-building wiring leading to a selected jack.

12. The method of claim 11 further comprising subsequently reprogramming the switch bank of the access terminal such that at least one telephone line or extension now connects to in-building wiring leading to a different jack from that previously selected.

13. The method of claim 11 wherein said programming access includes a keypad in the exterior of the access terminal.

14. The method of claim 13 wherein said programming access further includes a display associated with said keypad.

15. The method of claim 11 wherein said programming access includes a display panel and pointer input device.

16. The method of claim 11 wherein said programming access includes a digital data communications port connectable to a computer network.

17. The method of claim 11 wherein said programmable access includes a modem port connectable via telephone to a remote programming terminal.

18. The method of claim 11 wherein said programming of the switch bank via exterior programming access is mediated by a microcontroller receiving user selections from the programming access and controlling the settings of the switch bank in accord with said user selections, the microcontroller having associated memory for storing programmed switch bank settings and software for operating the microcontroller.

* * * * *